(12) United States Patent
Wales

(10) Patent No.: US 8,328,253 B2
(45) Date of Patent: Dec. 11, 2012

(54) HEAT SHIELD FOR GRILLING TOOLS

(76) Inventor: Michael Wales, Riverside, CT (US)

(*) Notice: Subject to any disclaimer, the term of this patent is extended or adjusted under 35 U.S.C. 154(b) by 0 days.

(21) Appl. No.: 12/961,263

(22) Filed: Dec. 6, 2010

(65) Prior Publication Data

US 2011/0187137 A1  Aug. 4, 2011

Related U.S. Application Data

(60) Provisional application No. 61/267,301, filed on Dec. 7, 2009, provisional application No. 61/365,110, filed on Jul. 16, 2010.

(51) Int. Cl.
*A47J 43/28* (2006.01)
(52) U.S. Cl. .................. 294/7; 294/9; 294/131; 30/323
(58) Field of Classification Search .............. 294/7, 8, 294/99.2, 131, 9–11; 30/323, 326; 16/431
See application file for complete search history.

(56) References Cited

U.S. PATENT DOCUMENTS

| | | | | |
|---|---|---|---|---|
| D32,918 S | * | 7/1900 | Ericson | D7/688 |
| 830,016 A | * | 9/1906 | Sims | 294/131 |
| 856,635 A | * | 6/1907 | Hazzard | 30/148 |
| 1,096,204 A | * | 5/1914 | Taggart | 294/131 |
| 1,330,406 A | * | 2/1920 | Stricklin | 2/17 |
| 1,432,108 A | * | 10/1922 | Johnson | 30/129 |
| 2,436,507 A | * | 2/1948 | Ellwood | 2/17 |
| 3,669,487 A | | 6/1972 | Roberts et al. | |
| 3,858,320 A | | 1/1975 | Neal et al. | |
| 3,906,632 A | * | 9/1975 | Oppenheimer | 30/322 |
| 4,103,420 A | | 8/1978 | Davis | |
| 4,768,288 A | | 9/1988 | Culbertson | |
| 5,206,998 A | * | 5/1993 | Oriente et al. | 30/142 |
| 5,400,459 A | | 3/1995 | Jarecke et al. | |
| 5,787,438 A | | 7/1998 | Cink et al. | |
| 6,061,862 A | | 5/2000 | Whitaker | |
| 6,125,493 A | | 10/2000 | Daw | |
| 6,131,977 A | * | 10/2000 | Sacks et al. | 294/99.2 |
| 6,757,930 B2 | | 7/2004 | Kajgana | |
| 2004/0006876 A1 | | 1/2004 | Popeil et al. | |
| 2007/0125224 A1 | | 6/2007 | Thomas | |
| 2007/0187963 A1 | | 8/2007 | Repp et al. | |

OTHER PUBLICATIONS

International Search Report and Written Opinion of the International Searching Authority; PCT/US10/59171; Jan. 20, 2011; 19 pages.

* cited by examiner

*Primary Examiner* — Dean Kramer
(74) *Attorney, Agent, or Firm* — St. Onge Steward Johnston & Reens LLC (57) ABSTRACT

A heat shield having at least one shield portion, a grip having a proximal end and a distal end, and a collar located proximal of the grip and adapted to receive the shaft of a tool is provided herein. The at least one shield portion is rotatable with respect to the grip and may be weighted such that it remains pointing downward when the grip portion is rotated about a longitudinal axis therethrough. The at least one shield portion may include a main shield and at least one secondary shield rotatably connected to the main shield. The heat shield may also be provided as part of a cooking tool having a shaft with a proximal end and a distal end and a cooking element attached at the distal end of the shaft.

25 Claims, 11 Drawing Sheets

HEAT SHIELD FOR GRILLING TOOLS

CROSS-REFERENCE TO RELATED APPLICATIONS

This application claims priority benefits under 35 §U.S.C. 119(e) of the U.S. Provisional Application No. 61/267,301 filed on Dec. 7, 2009 and U.S. Provisional Application No. 61/365,110 filed Jul. 16, 2010.

FIELD OF THE INVENTION

The invention relates generally to a heat shield for protecting a user's hand from a heat source, and more specifically to a heat shield for use with grilling tools, such as spatulas, forks and tongs, etc., for protecting a user's hand from the heat of a grill.

BACKGROUND OF THE INVENTION

Home grilling is a wide-spread field of cooking that continues to be popular. Meats or other foods (e.g., vegetables, tofu, etc.) are typically cooked on a metal grate suspended above a heat source. Grilling is often performed outdoors, using charcoal (real wood or preformed briquettes), wood, propane gas, or some other combustible heat source, although not limited thereto.

Due to the proximity to the heat source, there are many dangers associated with grilling. While many cooking and/or grilling tools, such as spatulas, forks, and tongs, etc., may have a handle that is long enough to keep the holder's hand away from the heat source while manipulating the food being cooked, this may not be enough to prevent injury. As grills get larger and larger, it is increasingly more difficult to find cooking and/or grilling tools that are designed to protect the user from the heat source while at the same time permitting the easy storage of the tool after use.

A need exists to address these and other problems associated with grilling tools, such as spatulas, forks, and tongs. Therefore, it would be beneficial to have superior grilling tools, and in particular, a superior spatula, fork, and tongs, for protecting a user's hand from a heat source.

SUMMARY OF THE INVENTION

Accordingly, it is an object of the present invention to provide a heat shield for grilling tools which can protect a user's hand from heat when the cooking and/or grilling tool is being used in the vicinity of a hot grill or other heat source.

It is a further object of the invention to provide an expandable heat shield for grilling tools that can be expanded to protect a larger area of the user's hand and then retracted when not in use.

It is yet a further object of the invention to provide a heat shield that is releasably attachable from the grill tool so that the tools may be interchanged, cleaned and/or replaced.

Still a further object of the invention is to provide a gravity-actuated heat shield that is rotatably attached to the grill tool such that the heat shield will continuously protect the user's hand from heat as the tool is rotated.

Yet another object of the invention is to provide a grilling tool having the features described above and, in addition, a grilling tool having an extendable shaft to maintain a further distance away from a heat source.

The grilling tools for use with the heat shield of the present embodiment include, but are not limited to, a spatula, fork, and tongs used for cooking over a heat source.

In one embodiment, a cooking and/or grilling tool with a heat shield comprising a shaft, which may be extendable in length, having a proximal end and a distal end; a cooking implement attached at the distal end of said shaft; a grip disposed proximal of said shaft; and a shield portion disposed in the proximity of the grip, is provided. The shield portion may be rotatable with respect to the grip such that the shield portion remains oriented downward when the grip portion is held substantially horizontal and is rotated about a longitudinal axis therethrough. The shield portion may be attached at least at a proximal end or a distal end of the grip and may extend substantially over the entire length of the grip. The cooking implement may be chosen from the group consisting of: a spatula, a spoon, a fork, a knife, scissors and tongs. In one embodiment, the shield portion may comprise a main shield and at least one secondary shield, rotatable with respect to said main shield. The at least one secondary shield may have an unretracted position and a retracted position. In a retracted position, the at least one secondary shield may lie completely within the profile of the main shield. A shield control may be provided for deploying the at least one secondary shield into an unretracted position. The heat shield may further comprise a collar located distal of the grip that is adapted to receive the proximal end of the shaft.

In another embodiment, a heat shield for use with cooking and/or grilling tools comprising a shield portion and a grip, the shield portion being rotatable with respect to said grip, is provided. The heat shield may further comprise a collar located distal of the grip that is adapted to receive the shaft of a cooking and/or grilling tool. As the shield portion is rotatable with respect to the grip, it will remain oriented downward when the grip portion is held substantially horizontal and is rotated about a longitudinal axis therethrough. In one embodiment, the shield portion may comprise a main shield and at least one secondary shield, rotatable with respect to said main shield. The at least one secondary shield may have an unretracted position and a retracted position. In a retracted position, the at least one secondary shield may lie completely within the profile of the main shield. A shield control may be provided for deploying the at least one secondary shield into an unretracted position.

In a further embodiment, a heat shield for use with cooking and/or grilling tools comprising a shield portion and a grip, the shield portion being attached at least at a proximal end or a distal end of the grip and extending substantially over the entire length of the grip, is provided. The heat shield may further comprise a collar located distal of the grip that is adapted to receive the shaft of a cooking and/or grilling tool. The shield portion may comprise a main shield and at least one secondary shield, rotatable with respect to said main shield. The at least one secondary shield may have an unretracted position and a retracted position. In a retracted position, the at least one secondary shield may lie completely within the profile of the main shield. A shield control may be provided for deploying the at least one secondary shield into an unretracted position.

Other embodiments of the system and method are described in detail below and are also part of the present teachings.

For a better understanding of the present embodiments, together with other and further aspects thereof, reference is made to the accompanying drawings and detailed description.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments.

Figure 1:
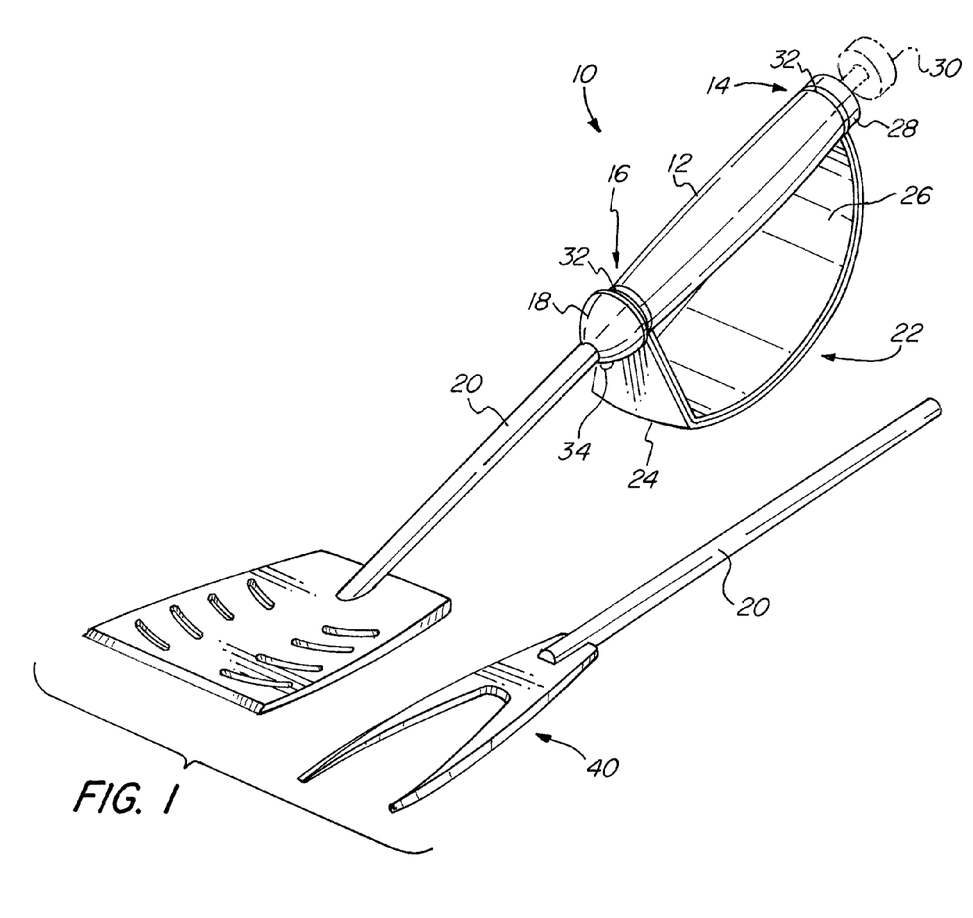
FIG. 1 is a perspective view of one embodiment of the heat shield of the present invention, shown in use with a cooking and/or grilling tool.
Figure 2:
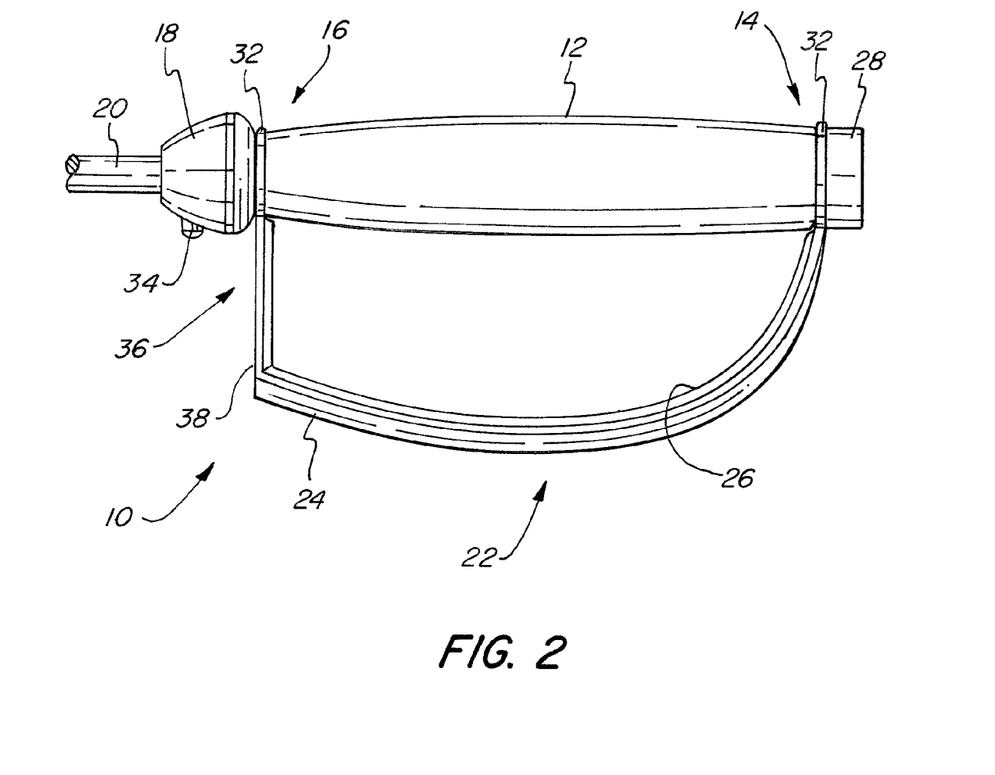
FIG. 2 is a side view of one embodiment of the heat shield of the present invention.

Referring now to FIG. 1, a perspective view of one embodiment of the heat shield 10 of the present invention is shown. The heat shield 10 may be used on any cooking and/or grilling tool 40, including spatulas, forks, knives, spoons, scissors and tongs, etc.

In one embodiment, the heat shield 10 comprises a grip 12 having a proximal 14 and a distal 16 end, a collar 18 disposed distal of the grip 12 and adapted to receive the shaft 20 of a cooking and/or grilling tool 40, and a shield portion 22 having a shield housing 24. For comfort, the grip 12 may be contoured to correspond to the shape of a user's hand and may be made of or covered in a suitable heat-resistant plastic or other material.

The heat shield 10 further comprises an end cap 28 proximal of the grip 12. The end cap 28 itself may be provided as a removable heat thermometer 30. Alternatively, a meat thermometer may 30 may be inserted into the end cap 28 for storage and removed when needed. In such a way, a user may remove the thermometer from a secure position within the back end of the heat shield 10 and measure the temperature of food as it is cooked.

The collar 18 may be any mechanism for receiving and holding, preferably releasably, the shaft 20 of a cooking and/or grilling tool 40 therein. In a preferred embodiment, the collar 18 simply holds the shaft 20 by friction fit. Alternatively, the collar 18 may comprise a collet, similar to the mechanism provided in a drill chuck so that it may receive and hold shafts 20 of varying diameters. The collar 18 may also hold the shaft 20 by a ball detent or, the collar may be internally threaded to accept an externally threaded shaft 20. The collar 18 may be attached to the distal end 16 of the grip 12 by any conventional means, such as by mating threads, friction fit or by use of an adhesive. One of skill in the art would also recognize that the collar 18 may be eliminated altogether and the shaft 20 may be attached directly to the grip 12. Moreover, while the collar 18 is preferably designed to releasably hold the shaft 20 of a cooking and/or grilling tool 40, it is also contemplated that the shaft 20 may be permanently attached to the collar 18 or directly to the grip 12, so as to provide a cooking and/or grilling tool 40 having an integrated heat shield.

Figure 8:
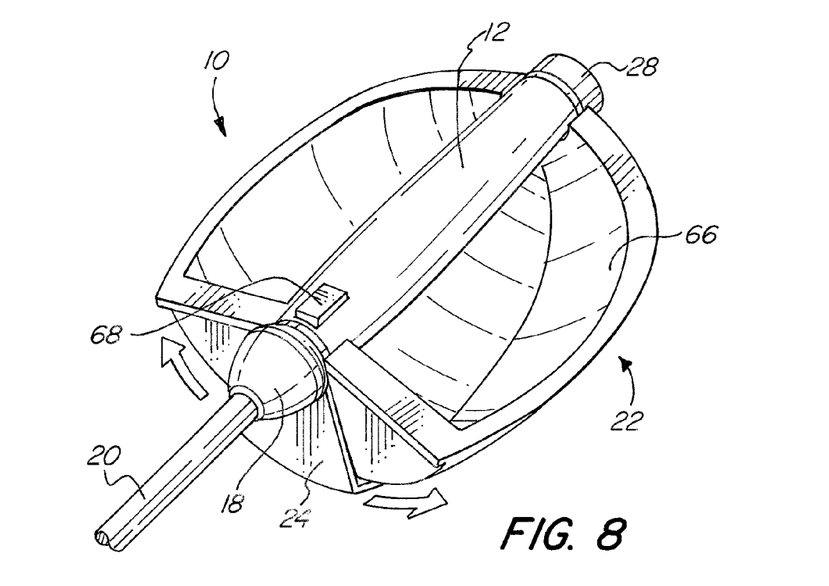
FIG. 8 is a perspective view of one embodiment of the heat shield of the present invention, showing the at least on secondary heat shield in an unretracted position.
Figure 9:
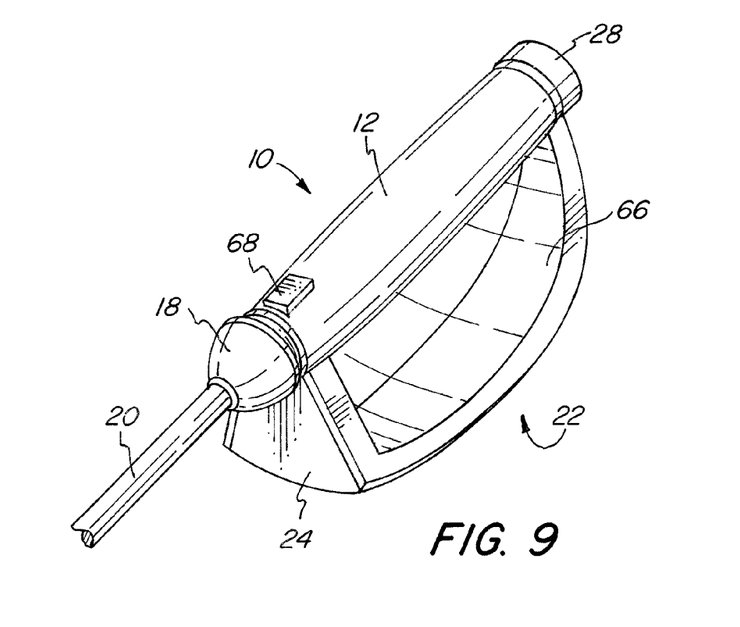
FIG. 9 is a perspective view of one embodiment of the heat shield of the present invention, showing the at least on secondary heat shield in a retracted position.
Figure 10:
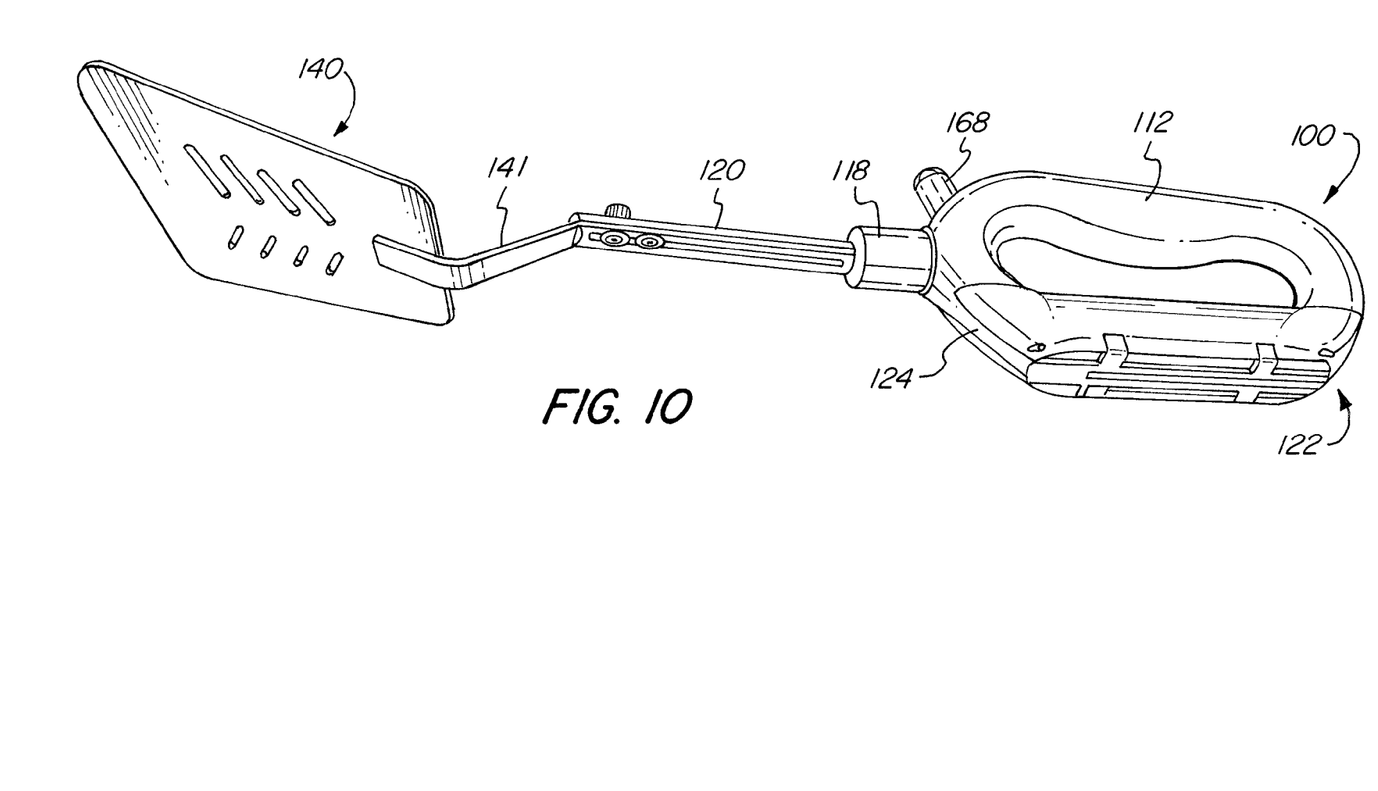
FIG. 10 is a bottom perspective view of another embodiment of the heat shield of the present invention, showing the at least one secondary heat shield in a retracted position.

In the embodiment show in FIGS. 1-7, the shield portion 22 is substantially arc-shaped, however, other shapes and configurations are contemplated herein, for example, as shown in the embodiment of FIGS. 8-10. In one embodiment, the heat shield 10 may form the shape of a basket. However, a heat shield 10 in any shape or configuration which provides protection from a heat source may be used. Moreover, the shield portion 22 preferably extends over the entire length, from the proximal end 14 to the distal end 16, of the grip 12 so as to protect as much of the user's hand as possible. However, the shield portion 22 may alternatively extend only partially over the length of the grip 12. The shield housing 24 may be made of any suitable heat-resistant material, preferably a heat-reflective material such as stainless steel or aluminum. For further heat protection, the shield housing 24 may also be provided with a lining 26 of a heat-resistant plastic, similar to the material of the grip 12.

The shield portion 22 is preferably rotatable with respect to the grip 12, although not limited thereto. In a preferred embodiment, the shield portion 22 rotates about an axle (not shown) disposed within and extending out from the grip 12. The grip 12 is permanently attached to the axle so that no relative movement occurs. The shield portion 22 terminates at both its proximal and distal ends with a neck 32, each having a through-hole (not shown) for receiving the axle therethrough. When assembled, the distal and proximal ends of the axle are passed through the through-holes of each neck 32 of the shield portion 22 with the proximal neck 32 lying between the end cap 28 and the proximal end 14 of the grip 12 and the distal neck 32 lying between the distal end 16 of the grip 12 and the collar 18. Enough space is provided between the end cap 28 and the proximal end 14 of the grip 12 and the distal end 16 of the grip 12 and the collar 18 so that each neck 32 may rotate freely around the axle. Accordingly, when the user holds the grip 12 and rotates the cooking and/or grilling tool 40, the axle freely rotates within the through holes of each neck 32.

This configuration of the shield portion 22 and the grip 12 is merely exemplary and other methods and means for allowing the shield portion 22 to rotate with respect to the grip 12 are contemplated. For example, in another embodiment, the shield portion 22 may be provided with only one neck 32 at either a distal or a proximal end and, therefore, only rotatably connects to the axle at one end. The shield portion 22 may also be rotatably connected directly to at least one of the proximal 14 and distal 16 ends of the grip 12. Further, the shield may be connected, preferably rotatably, at either the proximal or the distal end of the grip.

Figure 3:
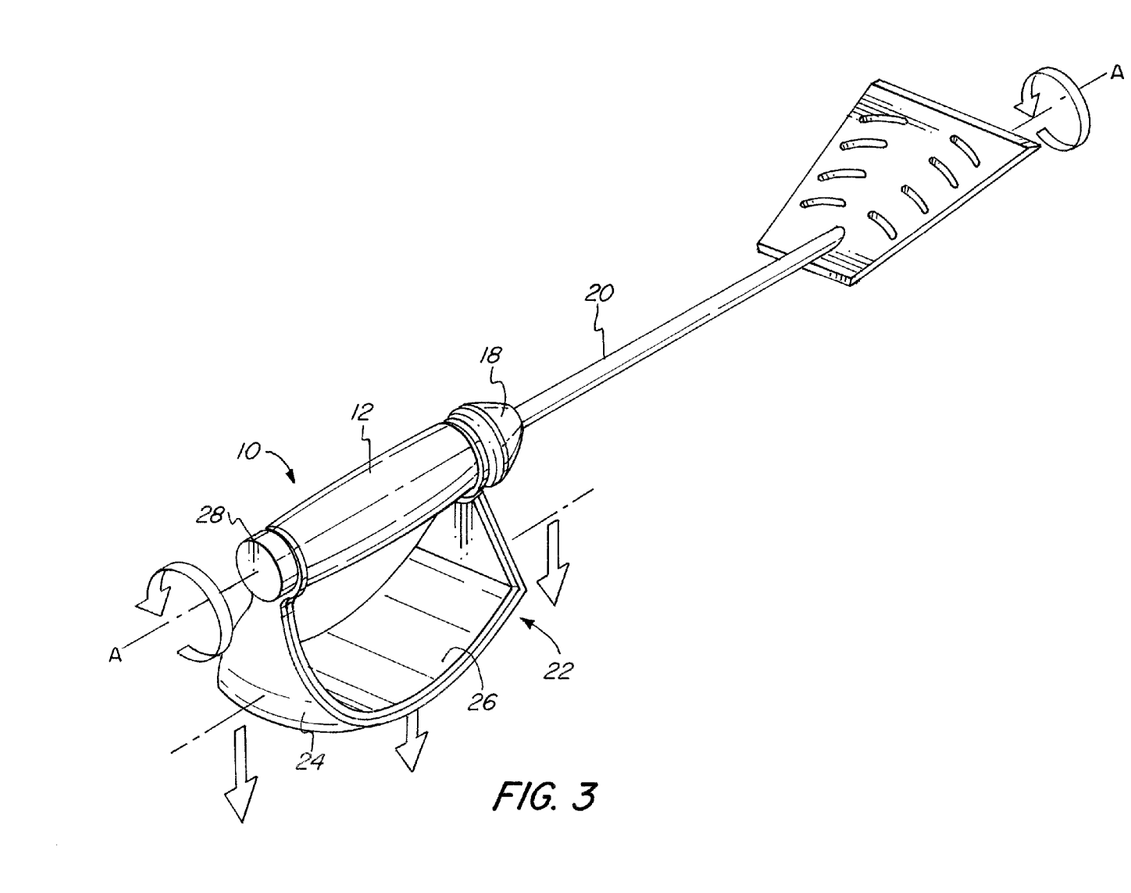
FIG. 3 is a perspective view of one embodiment of the heat shield of the present invention, shown in use with a cooking and/or grilling tool, illustrating the rotation of the cooking and/or grilling tool with respect to the shield portion.

As illustrated in FIG. 3, the heat shield 10 of the present teachings is gravity-actuated. Because the shield portion 22 is rotatable with respect to the grip 12, when a user rotates the tool along axis A defined by the grip 12 and shaft 20, gravity will act upon shield portion 22, maintaining its downward orientation. Accordingly, the heat shield 10 will continue to protect a user's hand from the heat source even when the tool is rotated to manipulate food, etc. In a preferred embodiment, the shield portion 22 may be weighted and will, therefore, be acted upon by gravity with greater force. This additional weight ensures that the shield always maintains a downward orientation (towards the heat source) when the grip 12 and cooking and/or grilling tool 40 are rotated.

The heat shield 10 may be constructed from reflective or insulated material, or a combination of the two materials, although not limited thereto, such that heat may be deflected and/or reflected to protect a user's hand. The expandable shield portion 22 is preferably positioned under entire length of the grip 12 and, therefore, under the user's hand. However, the shield portion 22 may be placed in any position so long as it permits continued use of the grill tool for extended periods of time without fear injury.

When used in connection with the heat shield 10 of the present invention, the shaft 20 of a cooking and/or grilling tool 40 may also be extendable in length by any known mechanical means and thus provide additional protection from heat sources by helping to keep a user's hand farther away from the heat. For example, the shaft 20 may be extended from the collar 18 by a release button 34 located thereon. In such a way, the release button 34, once activated by the user, allows the shaft 20 to be extended or retracted without having to touch a potentially hot surface simply by hooking the grilling tool 40 on the corner of a surface and pulling back on the grip 12 and vice versa. Once the release button 34 is deactivated shaft 20 is secured within the collar 18. This may be achieved by a spring-loaded pin or any other known mechanical means. The release button 34 is currently shown as a button, but may be in the form of a switch, knob, lever, or any other form of control capable of allowing extension of the shaft 20. Alternatively, the shaft itself 20 may be telescoping and be freely extendable or retractable into any number of lengths. The shaft may also be extendable and lock into certain present positions.

Figure 4:
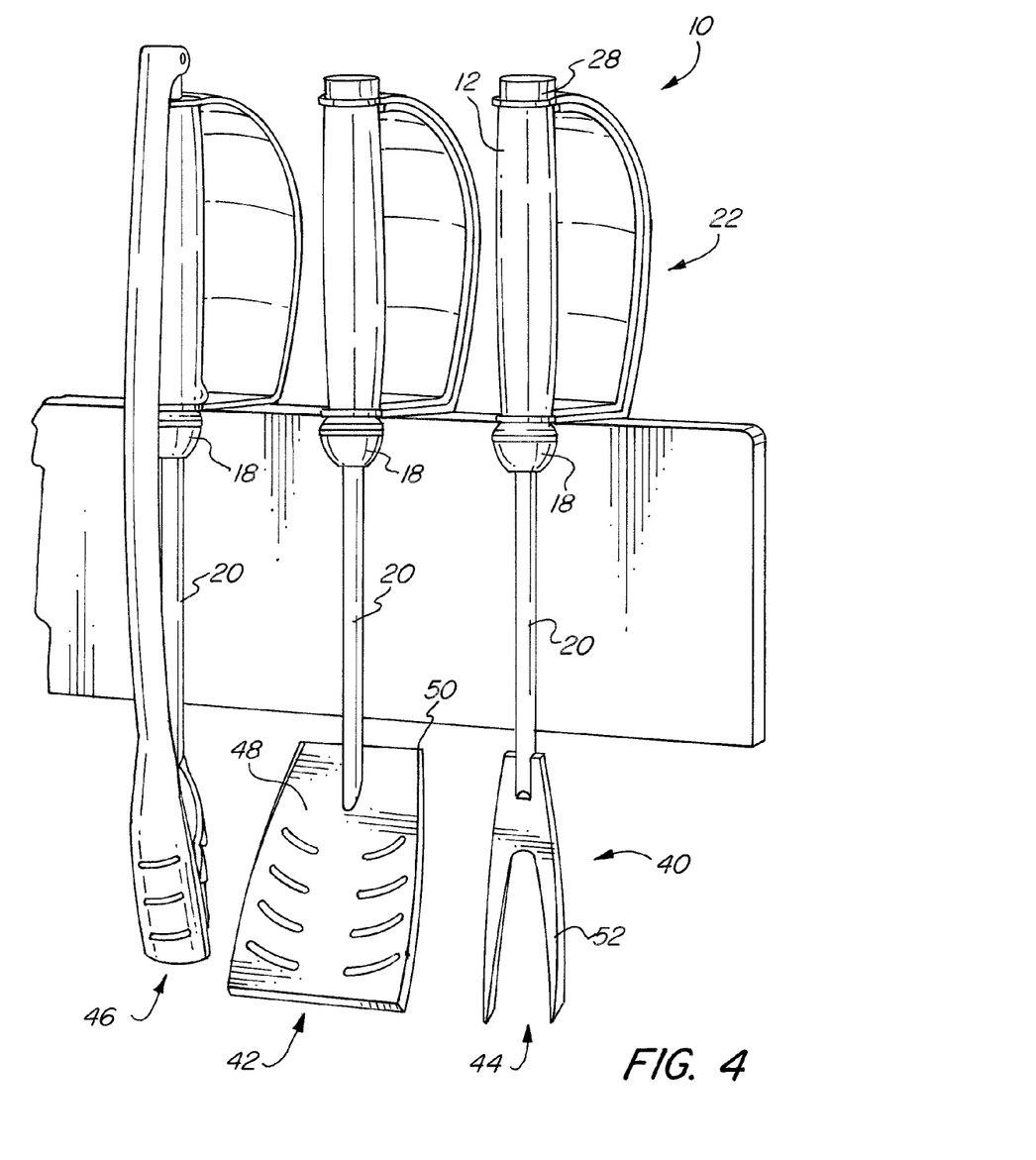
FIG. 4 is a front-perspective view of one embodiment of the heat shield of the present invention, shown in use with a spatula, a fork and tongs.

To aid in storage of the heat shield 10, with or without a cooking and/or grilling tool 40 attached thereto, the distal face 36 of heat shield portion 22 may be substantially flat so that it may rest on the edge of a surface. As shown in FIG. 4, in one embodiment, the grilling tools in storage configuration hang in a substantially vertical position from a structure. The heat shield 10 may be easily and releasably stored on a surface simply by resting the distal face 36 of the shield portion 22 on an appropriate surface, allowing the collar 18 and the cooking and/or grilling tool 40 to hang off the edge. The heat shield 10 may then be stored on a structure such as the side of a grill shelf or caddy, although not limited thereto, and provide a storage configuration for the grilling tools when not in use. In another embodiment, the distal face 36 of the shield portion 22 may be provided with a magnet 38. Alternatively, the distal face 36 of the shield portion 22 may be made of a magnetic material. Further, the heat shield 10 may come packaged in a kit with a mounting plate for the magnet 38 to adhere to, which may be constructed from some magnetic material, although not limited thereto. The mounting plate may then be affixed to a structure such as the side of a grill, although not limited thereto, and provide a storage place for the heat shield 10 when not in use. In yet another embodiment the heat shield 10 may hang on a hook via a conventional hanger. The hook may be connected to end cap 28.

As shown in FIG. 4. the heat shield 10 may be used with any number of different cooking and/or grilling tools 40, including a spatula 42, a fork 44 and tongs 46. In operation, a user inserts the shaft 20 of the cooking and/or grilling tool 40 of choice into the collar 18. The user may then manipulate food (or any other items) over a heat source with the cooking and/or grilling tool 40 by grasping the grip 12. In a preferred embodiment, the cooking and/or grilling tool 40 may be released from the collar 18 for washing or replacement. In addition, this allows for one tool 40 to be exchanged for another so that the purchase of only one heat shield 10 per home is necessary.

The spatula has a substantially flat end 48 and an elongated shaft 20. A substantially flat end 48 may be preferred to allow the user to flip certain items or place and remove items from a cooking surface. However, other shapes and sizes may also be preferable in certain instances and the present teachings are not limited to a flat surface on the end of the spatula 42. In addition, the substantially flat end may be provided at an angle with respect to the elongated neck, which may further protect the user's hand from the heat source. The substantially flat end 48 also may be angled from the handle in such a way so that when the spatula 42 is placed on a surface only a back edge of the substantially flat end will touch the surface, while the rest of the flat end will stay in the air and remain clean.

In another embodiment, the spatula 42 may also be provided with a package opener 50 disposed in at least one of the corners of the back edge of the substantially flat end 48. The package opener comprises of a small insert and tooth which can open plastic packaging, such as a hot dog package.

The fork 44 comprises at least one tine 52 at the end of an elongated shaft 20. Additional tines and different configurations may also be preferable in certain instances and the present teachings are not limited to two tines as illustrated in FIG. 4.

Figure 5:
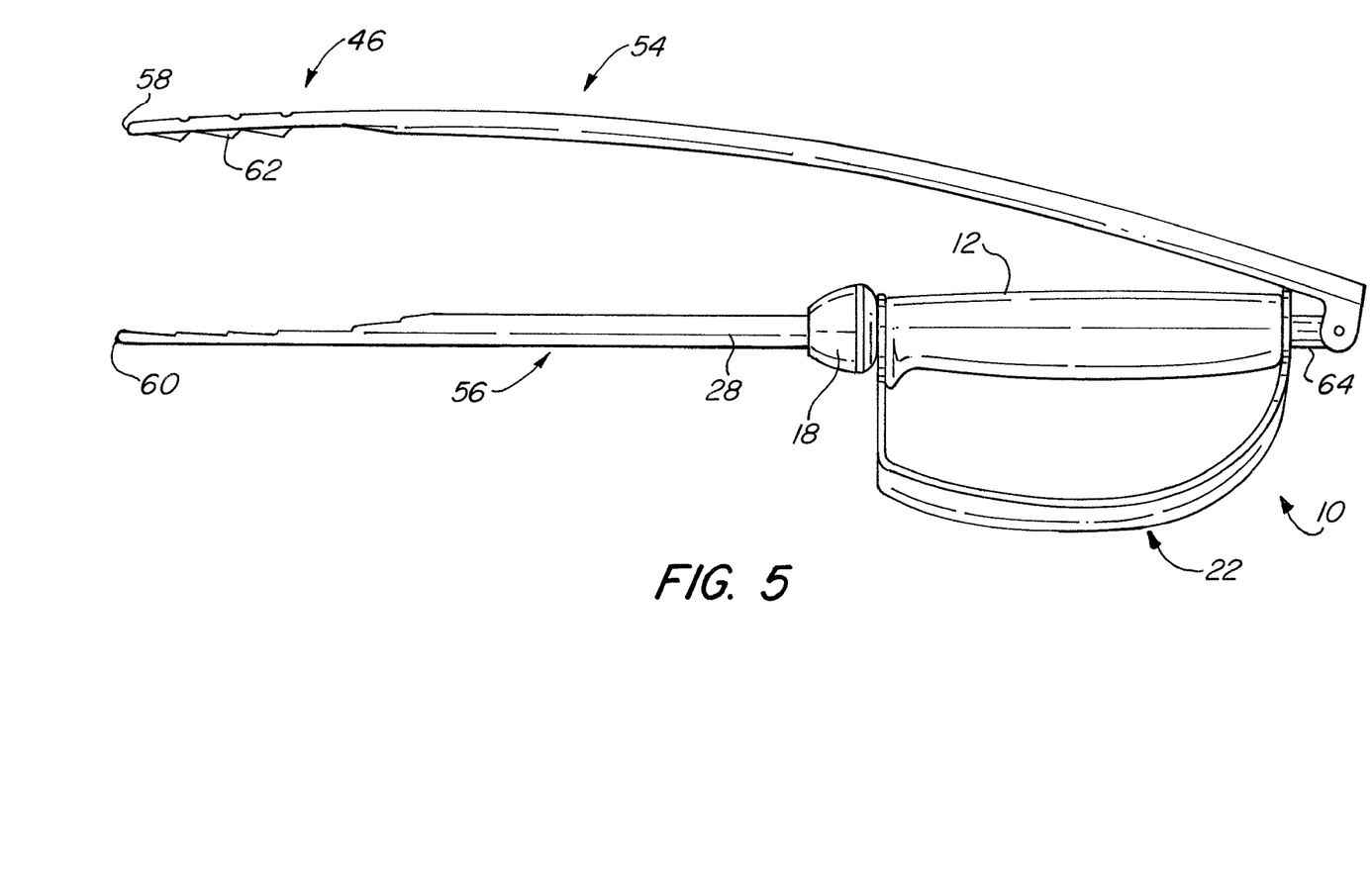
FIG. 5 is a side view of one embodiment of the heat shield of the present invention, shown in use with tongs.
Figure 6:
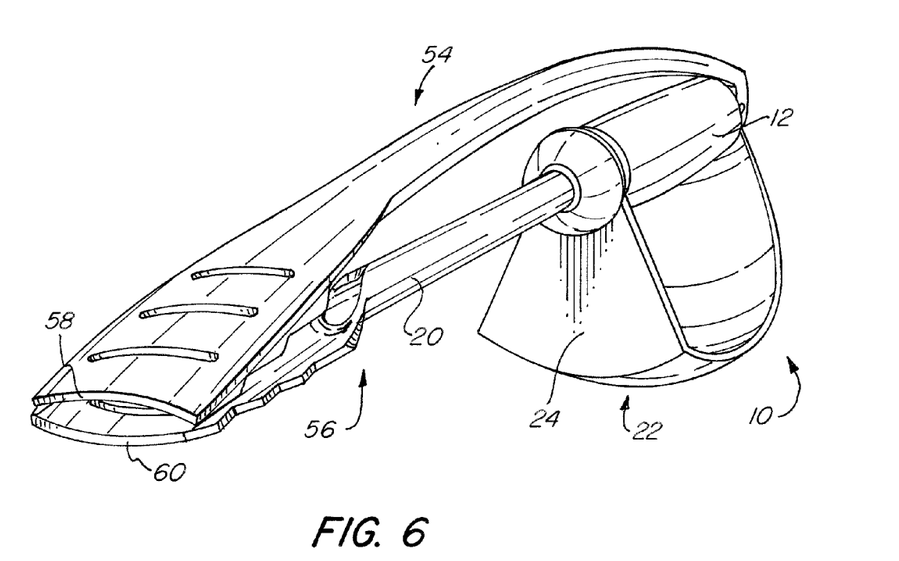
FIG. 6 is a front-perspective view of one embodiment of the heat shield of the present invention, shown in use with tongs.
Figure 7:
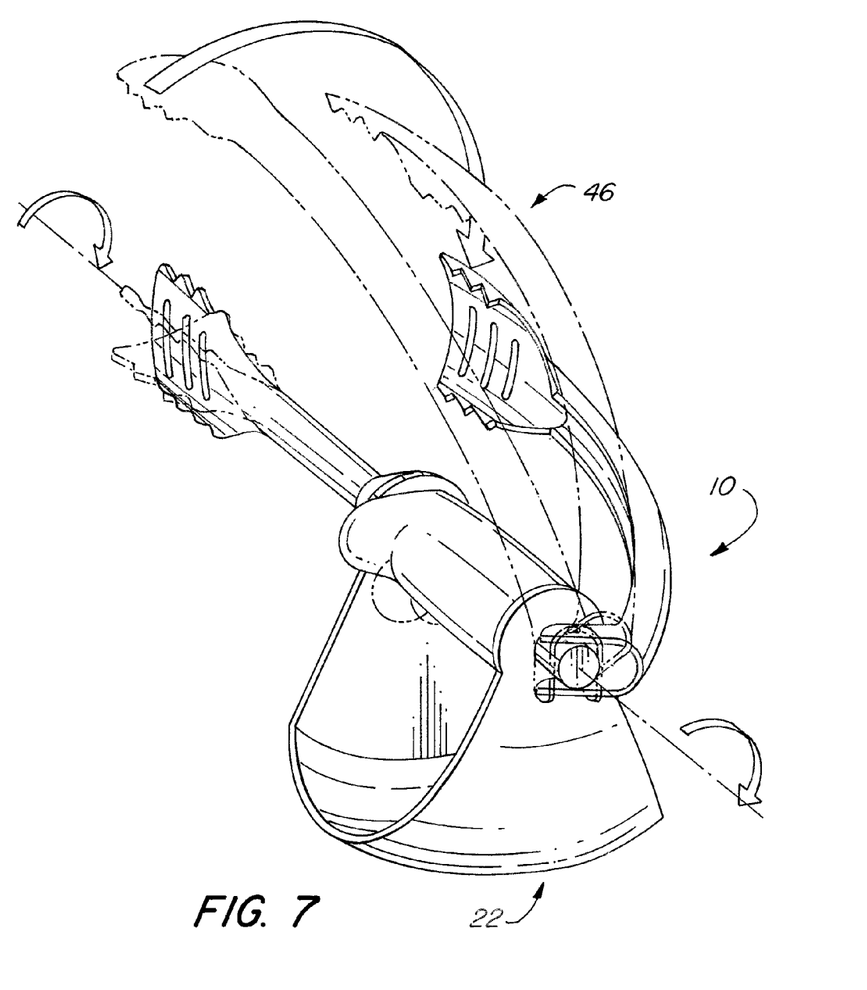
FIG. 7 is a front-perspective view of one embodiment of the heat shield of the present invention, shown in use with tongs, illustrating the rotation of the tongs with respect to the shield portion.

As further illustrated in FIGS. 5 and 6, the tongs 46 comprise an upper jaw portion 54 and a lower jaw portion 56, both terminating in opposing mouth portions 58, 60. The upper mouth portion 58, as shown in FIG. 6, may be curved to accommodate rounded food, such as hot dogs, whereas the lower mouth portion 60 may be more flat for scooping. However, other shapes and sizes for both the grip portions of the upper jaw and the lower jaw may be preferable in certain instances, and the present teachings are not limited to the shapes discussed herein. In addition, one or more of the grip portions may be provided on an inner face with backwards-facing teeth 62, which provide better grip of the food.

The tongs 46 are connected to the heat shield 10 by inserting the shaft 20 of the lower jaw portion 56 into the collar 18. The upper jaw portion 54 is hingedly connected by known means at the proximal end of the heat shield 10. An extension of the axle or an additional arm 64 is provided at the proximal end of the heat shield 10. This extension is necessary for the upper jaw portion 54 to clear the proximal end 14 of the grip 12. As is typical with traditional tongs, a spring also may be used to bias the upper jaw portion 54 in an open position. In addition, as is shown in FIG. 5, the shield housing 24 may alternatively be provided without a lining 26. The operation of rotatable shield portion 22 is the same for the tongs 46 as the other cooking tools 40. As shown in FIG. 6, when the tongs 46 are rotated about an axis A, the shield portion 22 remains pointing downward towards the heat source.

In another embodiment, shown in FIGS. 8 and 9, the heat shield 10 is further provided with at least one secondary heat shield 66. The at least one secondary heat shield 66 is rotatable with respect to the shield housing 24 and has two positions: a retracted position, shown in FIG. 9, and an unretracted position shown in FIG. 8. The at least one secondary heat shield 66 may be rotatable about an axle disposed within the grip 12 or may be rotatably connected directly to the grip 12 or the ends of the grip 12, in a similar fashion as described above with respect to the heat shield portion 22. The at least one secondary heat shield 66 may also be rotatably connected directly to the heat shield portion 22 by any known means.

Preferably, in a retracted position, the at least one secondary shield 66 lies completely within the profile of the shield housing 24, which at least partially protects a user's hand from a heat source. Accordingly, the shape of the at least one secondary heat shield 66 corresponds to the shape of the heat shield housing 24. In the embodiment shown in FIGS. 8 and 9, the heat shield housing 24 is substantially arc-shaped and therefore the at least one secondary heat shield 66 is also substantially arc-shaped.

In an unretracted position, the at least one secondary shield 66 rotates out from the profile of the shield housing 24 to provide even greater heat protection. In a preferred embodiment, the at least one secondary heat shield 66 is deployed using the heat shield control 68 disposed on the top of grip 12, which may be any known means for releasably holding the at least one secondary heat shield 66 in a retracted position, such as a spring-loaded latch, etc. The heat shield control 68 is shown as a button, but may be in the form of a switch, knob, lever, or any other form of control capable of deploying the at least one secondary heat shield 66. With the heat shield 10 according to the present teachings, a user may grasp the grip 12 and use the grill tool to safely manipulate items (e.g., food, etc.) on a heat source (e.g., grill, etc.).

As described previously with respect to other embodiments, the at least one secondary heat shield 66 will rotate with respect to the grip 12 so as to always point downward towards a heat source when the user rotates the cooking and/or grilling tool 40. This will occur whether the at least one secondary heat shield is rotatably connected to the shield portion 22 or is rotatably connected to the grip 12 or an axle disposed within the grip.

With large grills or extended exposure to a heat source, cooking and/or grilling tools 40 are known to get over-heated and burn a user's hand. However, with a grill tool using a heat shield according to the present teachings, the heat shield 10 in a retracted position may provide initial protection for the user. Deploying the at least one secondary heat shield 66 into an unretracted position may provide further protection for the user by guarding more of the user's hand.

Figure 11:
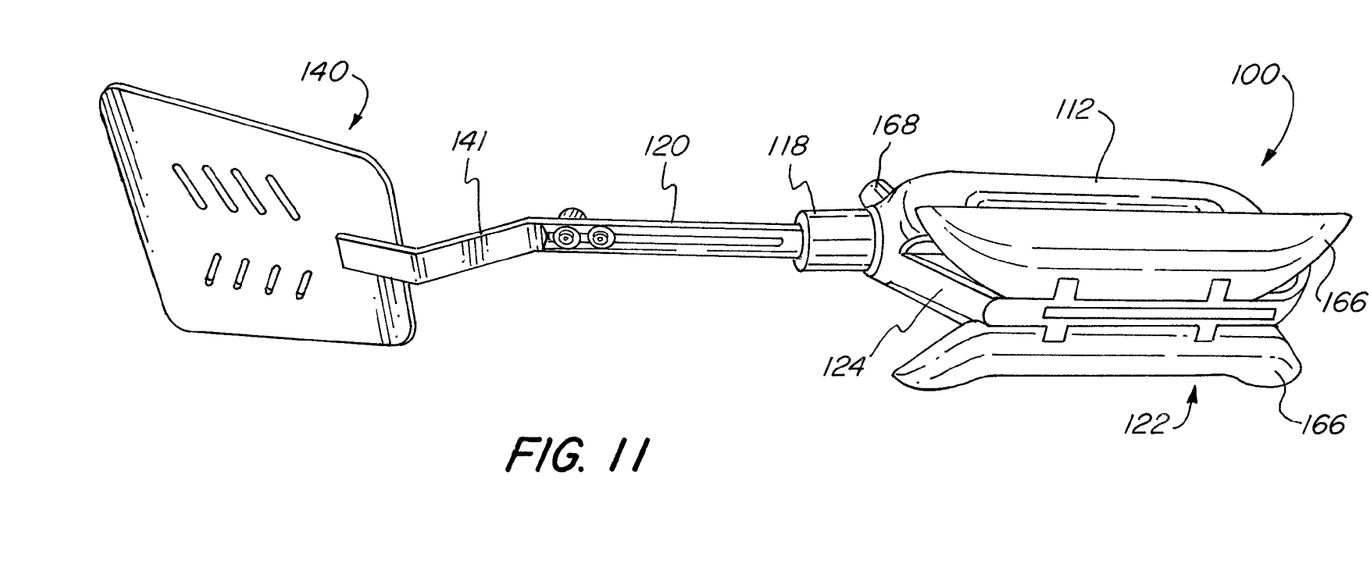
FIG. 11 is a top perspective view of one embodiment of the heat shield of the present invention, showing the at least one secondary heat shield in an unretracted position.
Figure 12:
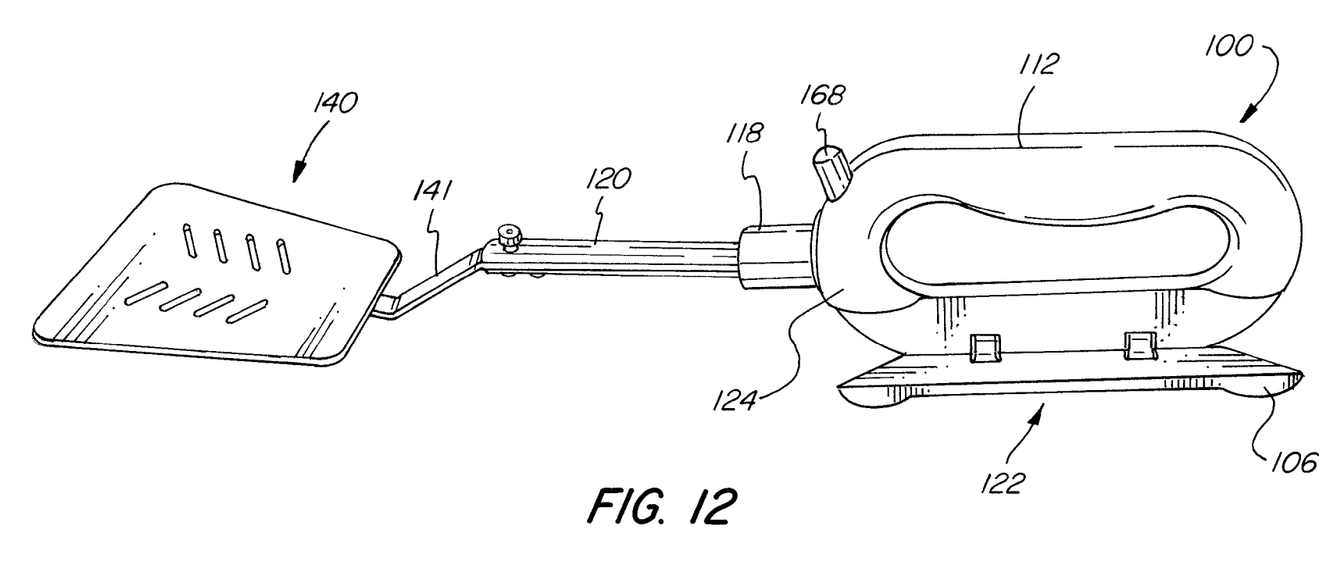
FIG. 12 is a bottom perspective view of one embodiment of the heat shield of the present invention, showing the at least one secondary heat shield in an unretracted position.

A further embodiment of the heat shield 100 of the present invention is depicted in FIGS. 10-12. The heat shield 100 for use with cooking and/or grilling tools comprises a grip 112, a shield portion 122 having a shield housing 124, collar 118, shaft 120 and heat shield control 168. While FIGS. 10-12 depict the heat shield as used with a spatula, the spatula may be removable and interchangeable with alternative ends, including, although not limited thereto, a spoon, fork, knife, scissors, tongs, etc. The grip 112 allows the user to easily grasp the heat shield 100 to permit ergonomic use of a cooking and/or grilling tool 140 as well as affording protection of a user's hand with shield portion 122, although not limited thereto. The angle of the shaft 120 to the neck 141 of the cooking and/or grilling tool 140 may provide additional protection from heat sources by helping to keep a user's hand away from heat.

Heat shield 100 further has at least one secondary heat shield 166 rotatably connected to shield housing 124 and having two positions: a retracted position, shown in FIG. 10, and an unretracted position shown in FIGS. 11 and 12. The at least one secondary heat shield 166 may be located at the bottom of the grip 112, although not limited thereto. In fact, the heat shield 100 may be placed anywhere on the cooking and/or grilling tool 140 where it may deploy and at least partially protect the user from heat.

In a retracted position, the at least one secondary shield 166 lies within the profile of the shield housing 124, which at least partially protects a user's hand from a heat source. Accordingly, the shape of the at least one secondary heat shield 166 corresponds to the shape of the heat shield housing 124. In an unretracted position, the at least one secondary shield 166 rotates out from the profile of the shield housing 124 to provide even greater heat protection. In a preferred embodiment, the at least one secondary heat shield 66 is deployed using the heat shield control 168 disposed on the top of grip 112, which may be any known means for releasably holding the at least one secondary heat shield 166 in a retracted position, such as a spring-loaded latch, etc. The heat shield control 168 is shown as a button, but may be in the form of a switch, knob, lever, or any other form of control capable of deploying the at least one secondary heat shield 166. With the heat shield 100 according to the present teachings, a user may grasp the grip 112 and use the grill tool to safely manipulate items (e.g., food, etc.) on a heat source (e.g., grill, etc.).

Referring now to FIG. 12, shown is a side-view perspective of one embodiment of the heat shield 100 in a deployed position. In one embodiment, although not limited thereto, the at least one secondary heat shield 166 may be hingedly connected to the bottom of the grip 112. In such a way, the user of the cooking and/or grilling tool 140 may activate the heat shield control 168 to deploy the at least on secondary heat shield 166 and protect the user from heat, although not limited thereto. The at least one secondary heat shield 166 may be in any shapes or configurations, and may be connected to the shield housing 124 in any number of ways, hingedly or otherwise, and is not limited to this particular embodiment. In fact, the shield housing 124 and at least one secondary heat shield 166 in any shape or configuration which provides protection from a heat source may be used.

The heat shield 100 may be constructed from reflective or insulated material, or a combination of the two materials, although not limited thereto, such that heat may be deflected and/or reflected to protect a user's hand. The heat shield 100 is preferably positioned under the grip 112 and the user's hand in order to permit continued use of the cooking and/or grilling tool 140 for extended periods of time without fear of getting burned. The bottom of the shield housing 124 may include magnets or some other means for attachment to allow the heat shield 100 to be removably affixed to another structure when not in use.

In one embodiment, although not limited thereto, the neck 120 may be extendable between a retracted position and an extended position via a telescoping system.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the specification and the attached drawings.

What is claimed is:

1. A cooking and/or grilling tool with a heat shield comprising:
   a shaft having a proximal end and a distal end;
   a cooking implement disposed at the distal end of said shaft;

a grip disposed proximal of said shaft; and a shield portion disposed about a bottom surface of the grip, said shield portion comprising a main shield and at least one secondary shield, said at least one secondary shield being rotatable with respect to said main shield;

said at least one secondary shield having an unretracted position and a retracted position, said at least one secondary shield lying completely within the profile of said main shield when in said retracted position.

2. The cooking tool of claim 1 wherein said shield portion is rotatable with respect to said grip.

3. The cooking tool of claim 1 wherein said shield portion is attached at least at a proximal end or a distal end of said grip.

4. The cooking tool of claim 3 wherein said shield portion is attached at a proximal end and a distal end of said grip.

5. The cooking tool of claim 3 wherein said shield portion extends substantially over the entire length of the grip.

6. The cooking tool of claim 1 wherein said shaft is extendable in length.

7. The cooking tool of claim 1 wherein said heat shield further comprises a shield control for deploying said at least one secondary shield into an unretracted position.

8. The cooking tool of claim 1 wherein said heat shield further comprises a collar located distal of said grip, said collar being adapted to receive the proximal end of said shaft.

9. A heat shield for use with cooking and/or grilling tools comprising:

a shield portion; and a grip;

said shield portion being rotatable about a longitudinal axis of said grip when said heat shield is fully assembled;

said shield portion further being weighted such that it will remain oriented under said grip if said grip is rotated about said longitudinal axis.

10. The heat shield of claim 9 wherein said shield portion is substantially arc-shaped.

11. The heat shield of claim 9 wherein said shield portion is disposed about a bottom surface of said grip.

12. The heat shield of claim 9 wherein said heat shield further comprises a collar adapted to receive a shaft of a cooking and/or grilling tool.

13. The heat shield of claim 9 wherein said shield portion comprises a main shield and at least one secondary shield.

14. The heat shield of claim 13 wherein said at least one secondary shield is rotatable with respect to said main shield.

15. The heat shield of claim 13 wherein said at least one secondary shield is hingedly connected to said main shield.

16. The heat shield of claim 13 wherein said at least one secondary shield has an unretracted position and a retracted position.

17. The heat shield of claim 16 wherein said at least one secondary shield lies completely within the profile of said main shield when in said retracted position.

18. The heat shield of claim 16 further comprising a shield control for deploying said at least one secondary shield into an unretracted position.

19. The heat shield of claim 9 wherein said shield portion is attached at least at a proximal end or a distal end of said grip.

20. The heat shield of claim 19 wherein said shield portion is attached at a proximal end and a distal end of said grip.

21. The heat shield of claim 9 wherein said shield portion extends substantially over the entire length of the grip.

22. The heat shield of claim 9 wherein said heat shield further comprises a collar located distal of said grip, said collar adapted to receive the shaft of a cooking and/or grilling tool.

23. The heat shield of claim 9 wherein said shield portion has at least one side that is substantially perpendicular to said grip.

24. A cooking and/or grilling tool with a heat shield comprising:

a shaft having a proximal end and a distal end;

a cooking implement disposed at the distal end of said shaft;

a grip disposed proximal of said shaft; and a shield portion disposed about a bottom surface of the grip, said shield portion being rotatable about a longitudinal axis of said grip when said heat shield is fully assembled;

said shield portion further being weighted such that it will remain oriented under said grip if said grip is rotated about said longitudinal axis.

25. The cooking and/or grilling tool of claim 24 wherein said shield portion has at least one side that is substantially perpendicular to said grip.

* * * * *